INVENTOR.
R. R. GOINS
BY Young & Quigg
ATTORNEYS

April 5, 1966 R. R. GOINS 3,244,688
PROCESS FOR PROCESSING OF POLYMERS
Filed April 16, 1962 4 Sheets-Sheet 3

INVENTOR.
R. R. GOINS
BY Young & Quigg
ATTORNEYS

INVENTOR.
R. R. GOINS
BY Young & Quigg
ATTORNEYS

United States Patent Office 3,244,688
Patented Apr. 5, 1966

3,244,688
PROCESS FOR PROCESSING OF POLYMERS
Robert R. Goins, Bartlesville, Okla., assignor to Phillips Petroleum Company, a corporation of Delaware
Filed Apr. 16, 1962, Ser. No. 187,509
5 Claims. (Cl. 260—94.9)

This invention relates to the processing of plastic materials. In one aspect it relates to a method for recovering polymers. In another aspect it relates to a process for conveying solids.

One object of this invention is to improve the conveying of solids, especially relatively light solids.

Another object of this invention is to provide an efficient process for processing plastic solids.

Another object of this invention is to insure efficient utilization of extrusion equipment.

Another object of this invention is to recover substantially solvent-free polymer from a polymer solution.

Other objects and advantages will be apparent to those skilled in the art from the following disclosure.

The production of normally solid polymers is known in the art. For example, such polymers can be produced by the polymerization of ethylene and/or other olefins, e.g., propylene or styrene, diolefins, unsaturated halides, and unsaturated esters. In some processes, the polymers are initially obtained in admixture with a solvent. The recovery of the polymer from the solvent presents certain difficulties which are dealt with in the copending application of Martin R. Cines, Serial No. 496,515, filed March 24, 1955, now U.S. 3,072,626. As shown in that application, a polyethylene can be recovered from a solution thereof in a hydrocarbon solvent by vaporizing said solvent in several stages under controlled conditions. In one of the evaporation steps, solvent is vaporized at subatmospheric pressure and a temperature below the melting point of the polymer, so that the polymer is recovered as a solid residue. The solid residue is then passed to a vacuum extruder-dryer wherein the remaining solvent is vaporized. The polymer, in the extruder-dryer, is subjected to kneading, which ordinarily converts the polymer into the liquid, or quasi-liquid, or plastic, condition, at least partly by the frictional effects of the kneading operation. The polymer is then extruded through one or more dies, cooled, and recovered.

It has been found that in operations of the type above-described, the solid residue obtained by the vaporization sometimes has a bulk density as low as from 0.5 to 2 pounds per cubic foot. The present invention provides a process by which a light solid, such as a polymeric residue obtained in such a solvent evaporation step, is conveyed in an improved manner or, for example, efficiently supplied to an extrusion and solvent removal operation.

The application is a continuation-in-part of my copending application Serial No. 512,008, filed May 31, 1955, now abandoned.

The present invention provides, in a process wherein a solution of a polymer in a solvent is subjected to conditions suitable for the evaporation of part of the solvent at a temperature below the melting point of said polymer and solid residue so obtained is subjected to extrusion under temperature and pressure conditions adapted to volatilize solvent remaining in admixture with said polymer, the improvement which comprises compressing said residue prior to said extrusion. Stated in another manner, the invention provides the improvement which comprises compressively conveying the polymeric residue from the evaporation zone into the kneading and extrusion zone of a process of the type described. Furthermore, the invention provides for the removal from the evaporation zone of liquid solvent that is not evaporated in the evaporation step so that entry of free liquid into the drying zone, e.g., kneading zone, is prevented or minimized.

FIGURE 1 of the drawing is a flow sheet illustrating one polyethylene production process with which the present invention is utilized.

Figure 1:
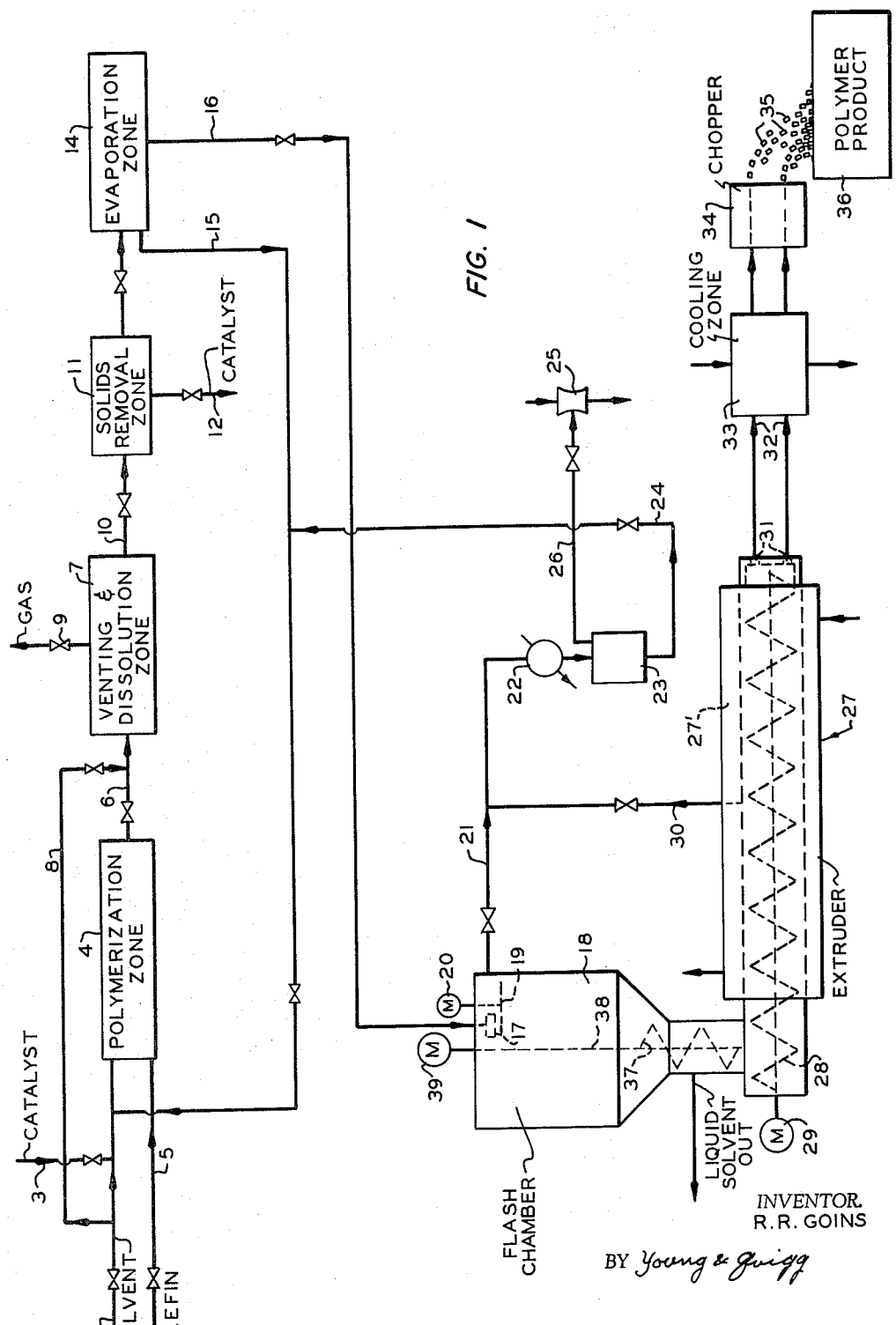

FIGURE 1 illustrates one process with which the present invention can be used. As illustrated in FIGURE 1, a solvent, such as a normally liquid paraffinic or naphthenic hydrocarbon, enters the system through inlet 2 and is mixed with a solid catalyst supplied through inlet 3 to form a slurry of catalyst and solvent. This slurry is passed to polymerization zone 4. A 1-olefin, such as ethylene, propylene, or a mixture of ethylene and propylene, enters polymerization zone 4 through inlet 5.

The polymerization in zone 4 is conducted in accordance with the process described in the copending application of Hogan and Banks, Serial No. 476,306, filed December 20, 1954, now Patent 2,825,721, issued March 4, 1958. Thus, for example, a 1-olefin having a maximum chain length of 8 carbon atoms and no branching nearer the double bond than the 4-position is contacted with a solid polymerization catalyst at a temperature in the range 150 to 450° F., and a pressure which can range from atmospheric to 700 p.s.i.g., or higher. Examples of such olefins are ethylene, propylene, 1-butene, 1-pentene, and butadiene. Examples of the solvents are normal hexane, the isoheptanes, 2,2,4-trimethylpentane, normal dodecane, the branched chain decanes, cyclopentane, cyclohexane, methylcyclopentane, and methylcyclohexane. The catalyst contains, as an essential ingredient, chromium oxide, including a substantial proportion of hexavalent chromium. The chromium oxide is ordinarily associated with at least one other oxide, especially one or more selected from the group consisting of silica, alumina, zirconia and thoria. A suitable catalyst can be prepared, for example, by impregnating a steam-activated, coprecipitated gel composite of silica and alumina, of the type commonly used as cracking catalysts, with an aqueous solution of a chromium compound which can be ignited to form chromium oxide. Examples of such compounds are chromium trioxide, chromium nitrate, chromium acetate, and ammonium dichromate. After the impregnation step, the composite is dried, and is preferably heated for a period of, for example, 2 to 10 hours, in a stream of anhydrous oxygen-containing gas, such as air, at a temperature in the range 900 to 1000° F. The catalyst can be utilized in the form of a fixed bed or in the form of a mobile mass of catalyst by techniques known in the art. A suitable technique for conducting the reaction comprises contacting the feed olefin with the catalyst, in the form of a slurry in the solvent, at a temperature from 250 to 320° F. in the case of ethylene, and at a sufficient pressure to maintain the solvent substantially in the liquid phase. The amount of ethylene present is ordinarily in the range from about 1 to about 10 weight percent based on total hydrocarbon. The total chromium content of the catalyst is ordinarily in the range from 0.1 to about 10 weight percent. Mechanical or other agitation can be used to aid in maintaining the catalyst in suspension in the solvent during the polymerization reaction. Reactor effluent, in the form of a mixture of polymer, solvent, unreacted olefin, and suspended catalyst, is withdrawn from polymerization zone 4 through conduit 6. Additional solvent can be added through conduit 8 to adjust the viscosity to any desired value, and the resulting mixture is passed to venting and dissolution zone 7. In this zone, the mixture is heated and agitated at a temperature higher than that in polymerization zone 4, for example, 300 to 350° F. to insure that substantially all of the polymer has been dissolved in the solvent. Unreacted gas can be vented from the system through outlet 9, the pressure being reduced to approximately 100 p.s.i.g., for example, in zone 7. The resulting solution containing suspended catalyst is passed through conduit 10 to solids removal zone 11, which is maintained at about the same temperature and pressure as zone 7 and which can include any known apparatus for removing solids from liquid, for example, a filter or a centrifuge. Catalyst is withdrawn through outlet 12. The resulting substantially homogeneous solution is passed through conduit 13 to evaporation zone 14 which is ordinarily maintained at a temperature above the melting point of the polymer, for example, in the range 250 to 320° F., in the case of polyethylene of the type here described. The pressure is ordinarily superatmospheric and in the range 0 to 100 p.s.i.g. The concentration of polymer in the solution entering evaporation zone 14 is ordinarily in the range 2 to 5 weight percent. The evaporation in zone 14 increases the concentration to a value in the range of approximately 5 to approximately 10 weight percent. The solvent evaporated in zone 14 can be recycled through conduit 15. The unvaporized solution passes through conduit 16 through a spray means 17 into flash chamber 18. Spray means 17 can comprise one or more restricted openings of conventional design. Since the solution of polymer, on emerging from spray means 17 produces, in addition to vaporized and unvaporized solvent, a solid residue that is ordinarily in the form of strands or filaments, a rotating cutter or chopper 19 can be provided in flash chamber 18 to sever the strands or filaments and produce a comminuted material. The rotating chopper 19 comprises one or more rotatable cutting members, e.g., knives or blades, and is driven by a suitable motor 20. Flash chamber 18 is ordinarily maintained at a subatmospheric pressure, for example, 0.1 to 13 p.s.i.a, and a temperature below the melting point of the polymer, for example, in the case of the polyethylene here described, in the range 100 to 250° F. Solvent vaporized in flash chamber 18 is withdrawn through conduit 21, condensed in condenser 22, and collected in accumulator 23. The recovered solvent can be recycled through conduits 24 and 15. The system is connected to a vacuum producing apparatus 25 through conduit 26. Liquid solvent that is not vaporized in the flash chamber, and that can be in the free state or loosely adsorbed on the surface of the polymer residue, is pressed or squeezed from the solid polymer residue in the hereinafter described step of compressively conveying the residue to the extruder or other drying step. The liquid is removed from flash chamber 18 by suitable outlets or weep holes that can be positioned at suitable locations in the lower portion of chamber 18. The liquid can be removed from the evacuated chamber by suitable pump means or can be drained into a vessel which is connected to the vacuum pump. If the flash chamber 18 is operated at atmospheric pressure or above atmospheric pressure, the liquid can be merely drained from the flash chamber.

The solid residue accumulating in flash chamber 18 is passed into extruder 27 which ordinarily contains one or more spiral conveyors or worms 28 driven by a suitable motor 29. Throughout this specification, for the sake of simplicity, the extruder is shown as comprising a single spiral conveyor. However, it will be understood by those skilled in the art that an extruder containing any suitable number, design and arrangement of such conveyors can be used. Also, extruder 27 can be supplied with a suitable heating means, such as a jacket 27' through which hot oil or other fluid can be circulated, to facilitate melting the polymer. A suitable extrusion apparatus for purposes of this invention is described in U.S. Patent Re. 23,948 (1955). The extruder is preferably of a type in which a vacuum can be maintained in at least part thereof and can be connected to the previously described vacuum apparatus by means of a conduit 30. In extruder 27 the polymer is kneaded by the action of the conveyor 28, and the heating under vacuum results in an expulsion of substantially all of the remaining solvent content. The polymer, in a plastic condition, is extruded through dies 31 in the form of strands or filaments 32, which pass through a cooling zone 33 and chopper 34. Cooling zone 33 can be of any suitable design such as a water spray or a tank of water. Chopper 34 can be of any desired type known in the art. The chopper cuts the strands or filaments of the polymer into small cylinders or cubes, depending upon the cross-sectional shape of dies 31. The cubes or cylinders 35 are collected as product in container 36.

According to this invention flash chamber 18 is equipped with helical conveyor 37, mounted on shaft 38, driven by motor 39. This conveyor positively or compressively conveys solid residue from chamber 18 into extruder 27, thus preventing "bridging" of the residue and overcoming any resistance of the residue to flow. The polymeric residue can be fed to extruder 27 at a rate sufficient to utilize fully the capacity of the extruder. Thus motor 39 can be operated at such a rate that solids are supplied to extruder 27 at a rate as great as that at which solids pass through the extruder. Consequently, a compression of the light solid residue occurs near the inlet of the extruder. The outlets for removal of liquid are preferably located in chamber 18 a short distance above the inlet to the extruder.

Figure 2:
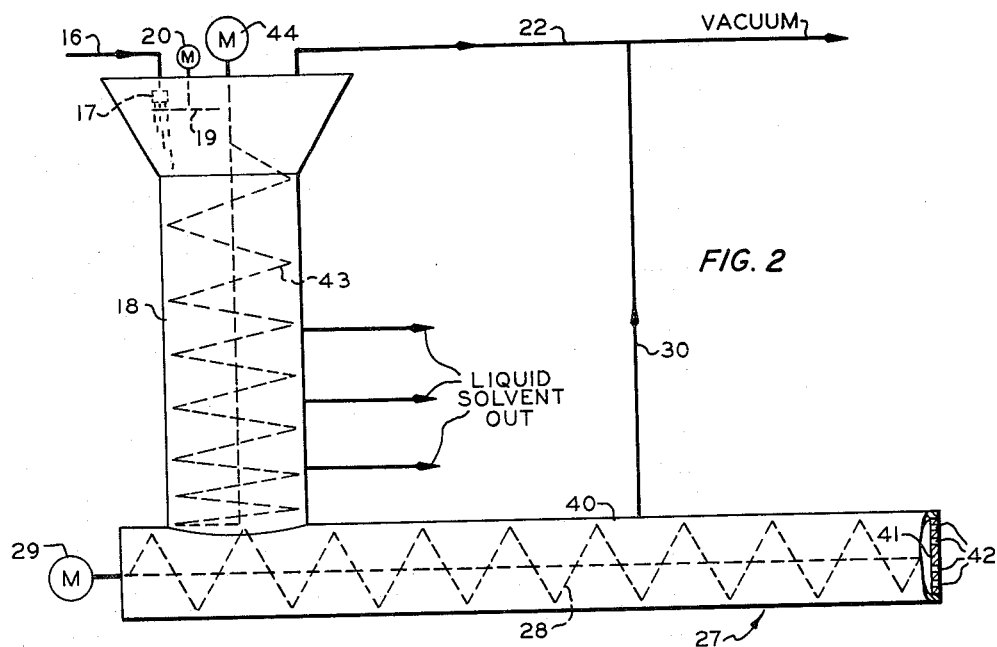
FIGURE 2 is a sectional elevation of an apparatus, applicable to the present invention, utilizing a chopper of the type shown in my copending application, Serial No. 539,523, filed October 10, 1955, now U.S. 3,089,194.

In FIGURE 2 and all of the subsequent figures, the same apparatus members are designated by the same numerals. In FIGURES 2 to 8, heating jacket 27' has been omitted for the sake of clarity. However, it is to be understood that inner chamber 40 in the modification shown in these figures can be provided with such a heating jacket or other heating device, such as an electric heater. As shown in FIGURE 2, screw conveyor 43 is vertically or axially positioned in flash chamber 18 and extends through most or substantially all of the length thereof. Conveyor 43 is preferably, as illustrated in FIGURE 2, of a type having a decreasing pitch from top to bottom, thus being capable of producing an increased compression of the loose or flocculent residue and, at the same time, conveying the residue into extruder 27. A suitable motor 44 is provided to rotate conveyor 43. Thus, as the loose flocculent solid residue is formed in vacuum chamber 18, it is positively and compressively conveyed into the extruder 27, thus supplying feed to the extruder at as great a rate as the extruder can process the plastic material. The desired amount of evaporation of solvent can be obtained by adjusting the preheating of the solution fed to chamber 18 and by suitably regulating the degree of evacuation produced in chamber 18. Chamber 18 can have a shape other than that shown in FIGURE 2. For example, it can be conical, frusto-conical, pyramidal or frusto-pyramidal, i.e., tapered throughout its entire height. In FIGURE 2, and all of the subsequent figures, the outlets for removal of liquid comprise a plurality of openings in the sides of chamber 18 extending from a point just below the inlet 16 to a point just above the inlet to the extruder. The openings through the walls of the flash chamber can be in the form of slots, round openings, square openings, and the like. Longitudinal slots are often preferred because small dimensioned openings can be easily fabricated into the chamber walls by the use of spaced parallel bars or strips in fabricating the chamber. Slots will usually be about 0.005 to 0.02 inch in width and round openings will usually be about 0.02 to 0.1 inch in diameter.

Figure 3:
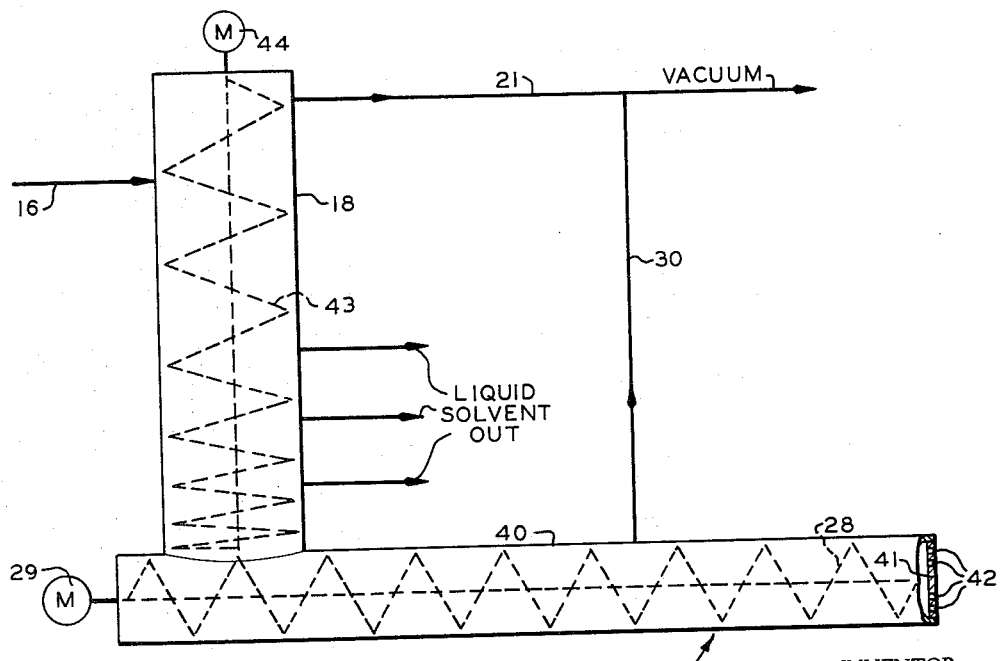
FIGURE 3 is a sectional elevation of a modified apparatus applicable to this invention but without the chopper shown in FIGURE 2.

The apparatus shown in FIGURE 3 operates in a manner similar to that illustrated in FIGURE 2. However, the chopper 19 is eliminated and the solution of polymer is fed directly to conveyor 43 in a direction transverse thereto. Thus, the polymer is compressively conveyed to extruder 27 substantially as rapidly as the residue containing the polymer is formed. Although the conveyor 43 in FIGURE 3 is illustrated as a single conveyor, it will be clear to those skilled in the art that two or more such conveyors can be provided in chamber 18, e.g., with axes substantially parallel.

Figure 4:
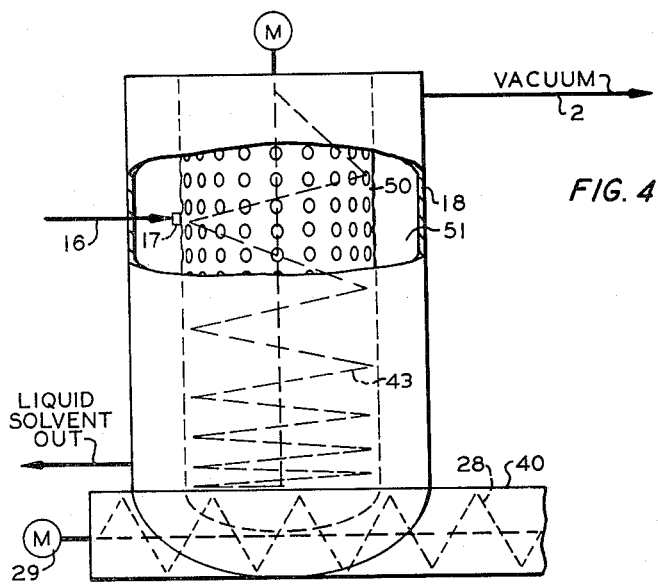
FIGURE 4 illustrates a modification of the apparatus of FIGURE 3.

FIGURE 4 illustrates a preferred form of the apparatus shown in FIGURE 3 and contains, as an additional feature, a perforate cylinder 50 surrounding the conveyor 43 so that the solvent vapor can escape, as rapidly as formed, and the liquid can escape, as rapidly as freed, through the perforations in cylinder 50 into an annular vapor chamber 51 and can be withdrawn through outlet 21, which is in direct communication with vapor chamber 51. Liquid can be withdrawn from annular chamber 51 through suitable openings in the wall of chamber 18.

Figure 5:
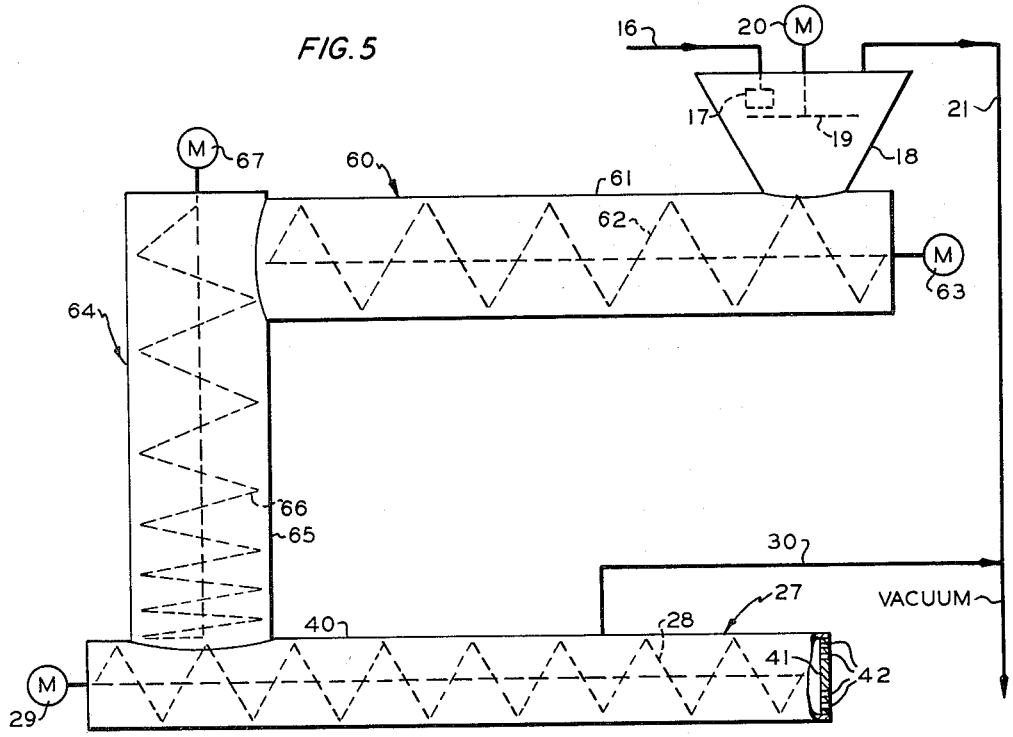
FIGURE 5 is a sectional elevation illustrating a further modification of apparatus applicable to this invention utilizing an intermediate conveyor.

In the modification shown in FIGURE 5 chamber 18 can be smaller than in the preceding figures and is in communication with a conveyor-drier indicated generally by the numeral 60 and comprising a gas-tight shell 61 and a helical conveyor 62 driven by a suitable motor 63. Solvent vaporization and removal continues in conveyor 60, although at this stage the unvaporized residue is ordinarily substantially solid. The conveyor 60 communicates with another conveyor 64 which is positioned at an angle with respect to the axis of conveyor 60 and can be vertically disposed, as shown in FIGURE 5. Conveyor 64 comprises a gas-tight cylindrical metal shell 65 in which is axially positioned a helical conveyor 66 having a decreasing pitch from top to bottom. Conveyor 60 is preferably designed to have a higher capacity than conveyor 64, so that loose flocculent residual solid can be conveyed through conveyor 60 into conveyor 64 wherein the loose solid is compressively conveyed into extruder 27 thus providing the extruder 27 with solid feed at such a rate that the capacity of extruder 27 is efficiently utilized.

Figure 6:
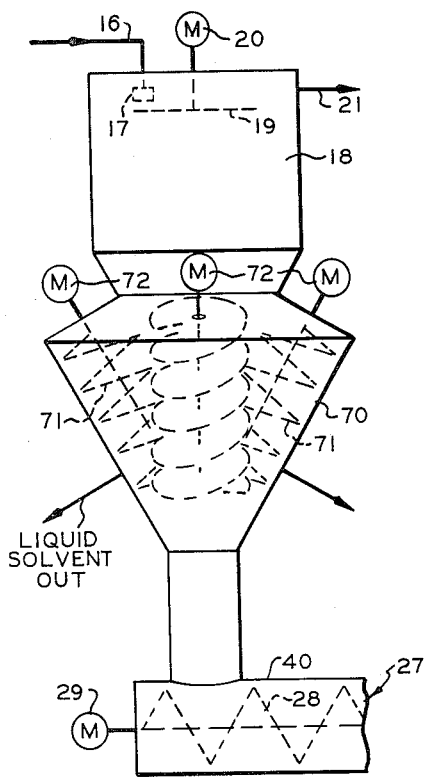
FIGURE 6 is a sectional elevation illustrating still another modification of apparatus applicable to this invention.

In the modification shown in FIGURE 6, chamber 18, at the bottom thereof, is in open communication with an auxiliary chamber 70 which can have the general configuration of an inverted cone, and is provided with two or more conveyor 71 which are set at an angle and driven by suitable motors 72. As indicated in the drawing, the conveyors 71 are preferably of decreasing pitch from top to bottom. It will be clear to those skilled in the art that any desired number of these conveyors can be positioned around the periphery of the chamber 70 in FIGURE 6. It will also be recognized by those skilled in the art that the total cross-sectional area of the conveyors should be almost as great as the cross-sectional area of chamber 70 at any particular elevation. Alternatively, the conveyors can be interlocking.

Figure 7:
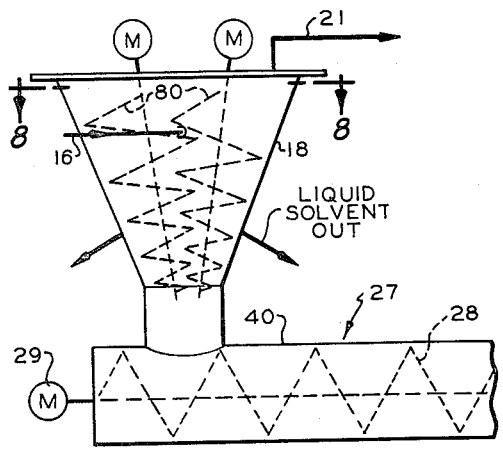
FIGURE 7 is a sectional elevation illustrating another apparatus applicable to this invention.

The modification of the invention illustrated in FIGURE 7 is similar to that shown in FIGURE 6 but utilizes interlocking conveyors 80 having a design somewhat similar to conveyors 71 in FIGURE 6. Furthermore, in the modification shown in FIGURE 7 the design is simplified by making chamber 18 in the form of a single inverted frustum of a cone. Furthermore, two or more inlets 17 can be provided for the polymer solution and chopper 19 can be eliminated. The feed is thus delivered transversely to the conveyors 80.

Figure 8:
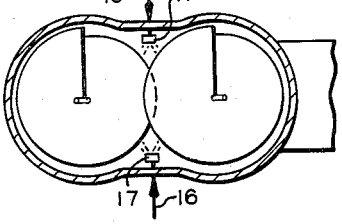
FIGURE 8 is a plan view of the interior of chamber 13 of FIGURE 7.

In the modifications shown in FIGURES 6, 7 and 8, the helical conveyors can be of either the interlocking type or of the noninterlocking type. The interlocking type is often preferred since it very efficiently produces a positive feeding action. It is also often preferred that each of the conveyors have decreasing pitch as well as decreasing diameter from top to bottom since this design facilitates densification of the polymeric residue. The conveyors when of the interlocking type can be perforated, grooved or splined, or they can be of the discontinuous type, having broken helical blades or flights. These arrangements facilitate the rapid removal of vapor from the flash chamber.

Figure 9:
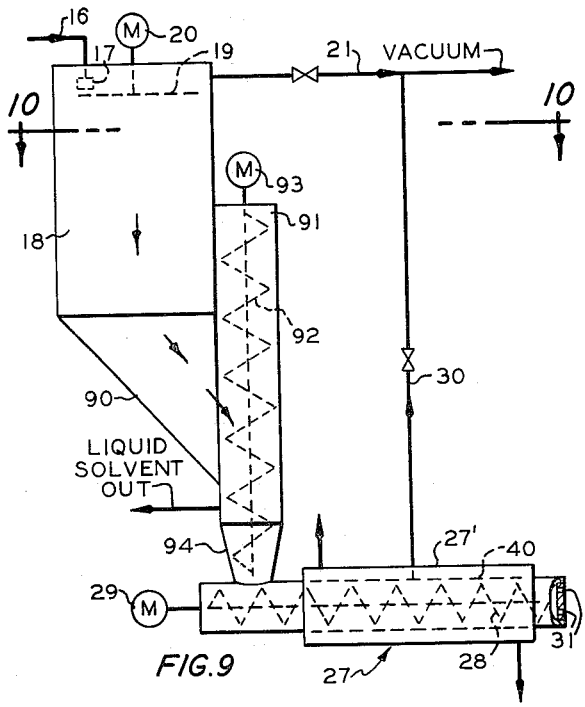
FIGURE 9 is an elevation, partly in section, of another modification of apparatus applicable to this invention.

In the modification of this invention shown in FIGURE 9, flash chamber 18 is provided with a tapered bottom section 90. A small cylinder 91 is also provided in upright position with its axis parallel to that of chamber 18. Cylinders 18 and 91 are in open communication with each other through a substantial portion of their length. Inside cylinder 91 is positioned screw conveyor 92 driven by a suitable motor 93. A lower section 94 of cylinder 91 is preferably tapered and has decreasing cross-sectional diameter from top to bottom. Conveyor 92 is preferably of the type having decreasing pitch from top to bottom and is also preferably of decreasing diameter in the same direction. This design, together with the tapered section 94 of the cylinder 91, provides a densification of polymer which falls downwardly through chamber 18 into section 90 and then laterally into cylinder 91. In cylinder 91 the polymer is compressively conveyed downwardly by conveyor 92 into extruder 27 and is therein treated as previously described.

EXAMPLE I

Figure 10:
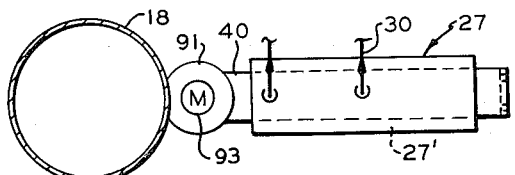
FIGURE 10 is a view taken along line 10—10 of FIGURE 9.

A polyethylene is produced by polymerizing ethylene in the presence of a chromium oxide catalyst at approximately 290° F., a pressure of about 600 p.s.i., and a total reaction time of approximately 4 hours. The catalyst used is prepared by impregnating a coprecipitated silica-alumina gel cracking catalyst (90 weight percent silica and 10 weight percent alumina) with an aqueous solution of chromium trioxide, drying, and heating in a stream of substantially anhydrous air at approximately 950° F. for about 5 hours. The catalyst is utilized in the form of a powder (20 to 100 mesh). It has a total chromium content of 2.5 weight percent and a hexavalent chromium content of about 2.0 weight percent. A slurry of the catalyst in cyclohexane is charged to a reactor provided with a mechanical stirrer. Ethylene is simultaneously charged to said reactor at such a rate that the ethylene content in the reaction mixture is about 2 weight percent based on total hydrocarbon. Ethylene conversion is about 60 to 70 percent. An effluent is withdrawn and heated to approximately 320° F. and a pressure of approximately 100 p.s.i., unreacted ethylene being previously vented. During the heating the liquid is agitated for a period of approximately 30 minutes to ensure substantially complete dissolution of polymer. The resulting mixture is filtered to remove the catalyst. The filtrate is subjected to evaporation to remove approximately one-half of the solvent and obtain a solution containing approximately 10 weight percent polymer. This solution is heated to 400° F. and passed to a vacuum flash chamber of the type shown in FIGURES 9 and 10. The flash chamber is operated at a temperature of approximately 160° F. and a pressure of 11 p.s.i.a. The unvaporized material in the flash chamber contains approximately 90 weight percent polymer and is in the form of a loose particulate solid having a bulk density of approximately 2 pounds per cubic foot. The cylindrical chamber 91 contains a spiral conveyor 92 which has a diameter of 4 inches, a constant pitch of 4 inches and a length of 24 inches. Rotation of the conveyor by means of an electric motor 93 at a speed of 20 r.p.m. results in a compression of the polymeric residue to a density of from approximately 5 to approximately 10 pounds per cubic foot and feeds the residue to a vacuum extruder-dryer of the type shown in Re. 23,948 (1955) at a rate of 25 pounds per hour. Rotation of the vertical conveyor at 70 r.p.m. results in a feed rate to the extruder-dryer of approximately 60 pounds per hour and a densification slightly greater than that previously described. Polymer is extruded from the extruder-dryer as rods that are uniform in diameter and that are substantially free of solvent. The polymer production rate is about 25 pounds per pound of catalyst per hour. Flash chamber 18 has a diameter of 18 inches and a height of 4 feet.

The process as described in Example I will not operate without the means for compressively conveying the polymer residue to the extruder, e.g., the spiral conveyor, because the light, fluffy polymer residue will not feed into the extruder.

EXAMPLE II

In a run similar to that of Example I the filtrate, containing about 5 weight percent polymer at a temperature of about 320° F. and a pressure of about 100 p.s.i., is charged directly to a flash chamber of the type shown in FIGURE 4, having a liquid outlet in the wall of the flash chamber just above and adjacent the bottom of the annular chamber 51. The cross-sectional area of the spiral conveyor is substantially equal to the inside diameter of the perforate cylinder 50 and the inlet spray means 17 is flush with the wall of perforate cylinder 50. The annular chamber 51 is 2 inches in cross-section. In the flash chamber the pressure is reduced to about atmospheric and the temperature is reduced to about 175° F. (the boiling point of cyclohexane). The unvaporized material in the flash chamber comprises solid polymer and liquid cyclohexane. The spiral conveyor has a pitch of 4 inches at the top and 2 inches at the bottom. Dimensions of the equipment are otherwise the same as in Example I.

The polymer production is the same as before, i.e., about 25 pounds per hour of uniform diameter rods. About 50 weight percent of the solvent is vaporized and about 44 weight percent of the solvent (about 220 pounds per hour) is removed as liquid from the annular chamber 51.

The process as described in Example II will not operate without the means for compressively conveying the polymer residue to the extruder, e.g., the spiral conveyor, because the extruder cannot remove the liquid which is present with the solid polymer and the extruded polymer contains an excessive amount of solvent.

Although the invention has been described with particular reference to the production of a polyethylene in a process of the type disclosed in the cited application of Hogan and Banks, the invention is not limited to the particular process described. It is generally applicable to any process wherein a normally solid polymeric residue is obtained by the evaporation of a solvent, and said residue is obtained in the form of a loose, light or non-dense material which is difficult to convey at a desired rate into a subsequent extrusion or other process step.

As will be understood by those skilled in the art, valves, pumps, heat exchangers, and other equipment not shown in the drawings, can readily be supplied by those skilled in the art. Evaporation chamber 18, in any of its modifications shown in the drawings, can be provided with suitable insulation, if desired. Thus, the top and sides of chamber 18 can be covered with a layer of insulating magnesia or asbestos. Also, one or more heat exchangers can be provided for heating the solution which enters flash chamber 18 through conduit 16, and one or more suitable reducing valves can be supplied for reducing the pressure of the solution prior to entry into flash chamber 18, if desired.

Furthermore, a suitable heating jacket can be attached to intermediate conveyor 60 in FIGURE 5. In addition, any desired auxiliary heating means, such as a steam jacket, can be attached to flash chamber 18.

Chopper 19 can be omitted from the apparatus in which it is shown, but its use is often preferred.

It will sometimes be desirable to operate flash chamber 18 under temperature and pressure conditions such that only a portion of the solvent is evaporated, e.g., only a sufficient amount of solvent being evaporated to provide the cooling and concentration necessary to precipitate the solid polymer. When only a portion of the solvent is evaporated, it will be necessary to remove the liquid solvent from the flash zone to prevent, at least substantially, entry of liquid into the extruder or other drying means.

Although an extruder is described as the drying means, other methods of drying the polymer can be employed, such as vacuum drying fluidized bed drying and the like.

That which is claimed is:

1. A process for recovering solid polymer from a solution of said polymer in a solvent which comprises passing said solution into a flash zone of reduced pressure wherein the temperature is below the melting point of the polymer so that at least a portion of the solvent is evaporated; removing solvent from said flash zone; and simultaneously compressing the resulting solid polymer residue in the form of filaments in said flash zone and passing same to a drying zone in a single step whereby the bulk density of the polymer residue is increased and additional solvent is removed therefrom while said polymer is being passed to said drying zone.

2. A process for recovering solid polymer from a solution of said polymer in a solvent which comprises passing said solution into a flash zone of reduced pressure wherein the temperature is below the melting point of the polymer so that a sufficient amount of solvent is evaporated to effect precipitation of the polymer in the form of filaments having low bulk density; removing solvent vapors from said flash zone; removing solvent liquid from said flash zone; and simultaneously compressing the resulting solid polymer residue in said flash zone and conveying same in a single step to a drying zone whereby the bulk density of the polymer residue is increased and additional solvent is removed therefrom while said polymer is being conveyed to said drying zone.

3. In a process for producing solid polymer wherein a solution of polymer in solvent containing therein suspended catalyst is recovered from a reaction zone, is diluted with additional solvent and is filtered to remove suspended catalyst, the improvement comprises flashing the filtrate into a zone of reduced pressure wherein the temperature is below the melting point of the polymer so that a sufficient amount of solvent is vaporized to effect precipitation of the polymer in the form of filaments having a low bulk density of about 0.5 to 2 pounds per cubic foot; removing solvent vapors and solvent liquid from said flash zone; and simultaneously compressing the precipitated polymer in said flash zone and conveying same to a drying zone in a single step whereby the bulk density of the polymer is increased to about 5 to 10 pounds per cubic foot and additional solvent is removed therefrom while said polymer is being conveyed to said drying zone.

4. The process of claim 3 wherein the polymer is a normally solid polymer of a 1-olefin having a maximum chain length of 8 carbon atoms and no branching nearer the double bond than the 4-position and wherein the solvent is substantially saturated liquid hydrocarbon.

5. The process of claim 3 wherein the polymer is a normally solid polymer of ethylene produced by polymerization of ethylene in the presence of a polymerization catalyst comprising chromium oxide as an essential ingredient and wherein the solvent is cyclohexane.

References Cited by the Examiner
UNITED STATES PATENTS

| | | | |
|---|---|---|---|
| 1,156,096 | 10/1915 | Price | 18—125 |
| 2,825,721 | 3/1958 | Hogan | 260—94.9 |
| 2,833,750 | 5/1958 | Vickers | 260—95 |
| 3,072,626 | 1/1963 | Cines | 260—94.9 |

JOSEPH L. SCHOFER, *Primary Examiner.*